(No Model.)
C. E. SCHAFER.
STAY BAR FOR BOILERS, TANKS, &c.
No. 437,458. Patented Sept. 30, 1890.
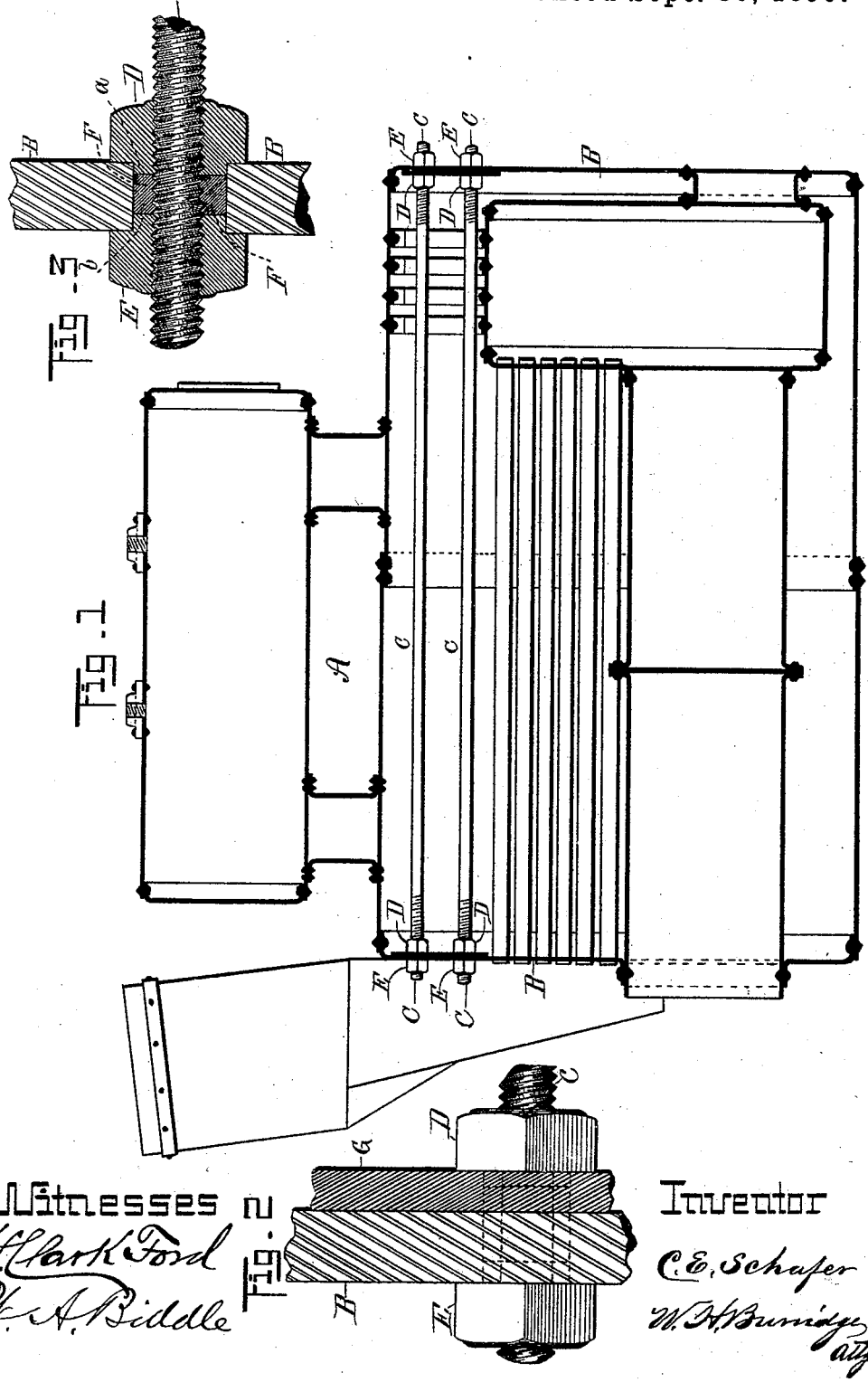
Witnesses
H. Clark Ford
W. A. Biddle
Inventor
C. E. Schafer
W. H. Burridge
Atty.

UNITED STATES PATENT OFFICE.

CHRISTIAN E. SCHAFER, OF CLEVELAND, OHIO, ASSIGNOR OF ONE-HALF TO DANIEL CONNELLY, OF SAME PLACE.

STAY-BAR FOR BOILERS, TANKS, &c.

SPECIFICATION forming part of Letters Patent No. 437,458, dated September 30, 1890.

Application filed April 16, 1890. Serial No. 348,262. (No model.)

*To all whom it may concern:*

Be it known that I, CHRISTIAN E. SCHAFER, a citizen of the United States, residing at Cleveland, in the county of Cuyahoga and State of Ohio, have invented certain new and useful Improvements in Stay Bars or Bolts for Boilers, Tanks, and other similar structures; and I do hereby declare the following to be a full, clear, and complete description thereof.

The nature of my invention relates more especially to the stay bolts or bars in boilers, although it can be used in other places where a stay bolt or bar is required for tight joints.

In the manufacture of steam-boilers it has heretofore been very difficult and almost impossible to secure the stay bolts or bars in any manner but the boiler would leak through the connection of the boiler and bolt owing to the continual contraction and expansion of the bolt. A cold bolt can be put into a boiler and drawn to its utmost tension by means of the nuts, and when the boiler is heated up the bolt will expand, and upon cooling and contracting it will change and not come back with the nuts and washers (which washers are generally used on the bolt between the nut and boiler-plate over the hole or bore for the bolt) to the former position in contaction with the boiler plate or head, causing a leak about the nuts and washers, and necessitating calking, and even then it is liable to leak. It will be seen by the following specification that the above-mentioned difficulty is overcome by my invention.

That the said invention may be fully seen and understood, reference may be had to the following specification and annexed drawings, in which—

Figure 1 is a vertical sectional view of a Scotch boiler, showing the application of the invention therewith. Fig. 2 is an enlarged detached section taken on one side of the center of the stay-bolt, showing a section of the boiler-plate, re-enforcing plate, and the improved stay-bolt, the boiler-plate and re-enforcing plate in cross-section. Fig. 3 is an enlarged view of a detached section of the boiler-plate and bolt without the re-enforcing plate, showing the boiler-plate, nuts, and packing in cross-section.

Like letters of reference designate like parts in the drawings and specification.

In Fig. 1 is shown the relative connection of a boiler and stay bolts or bars, Figs. 2 and 3 representing in detail the form and construction of the invention. Fig. 1 simply lines out the connection of the improvement with a steam-boiler A.

E represents the boiler-plate heads or ends; C, the bolts or bars; D, the interior nut; E, the exterior nut; F, the packing; G, the re-enforcing plate. (Not shown in Fig. 3.) The holes in the plate E and plate G (when a re-enforcing plate is used) are each formed of greater diameter than the bolt, as illustrated in Fig. 3. The two nuts D and E are of similar form, the projections $a$ entering the hole in the boiler-plate forming a shoulder on the interior nut D and the projections $b$ forming a shoulder on the exterior nut E. The bolt C is threaded on one end a sufficient distance to admit of one of the interior nuts being threaded onto said bolt far enough to allow sufficient play for the threading on of the interior nut at the opposite end of the boiler to allow of the bars being placed in position from the interior of the boiler, as required. The two interior nuts D are then screwed up in contact with the ends of the boiler, the projections $a$ entering the holes in the boiler-plate and the ends of the bolt protruding at each end. Copper, lead, or other suitable material for packing is then placed around the bolt in the hole and the outer nuts E screwed up in contact with the exterior of the boiler, the projections $b$ entering the hole on the opposite side of the plate from the projections $a$. It will be seen that the packing F is thus forced into the thread of the bolt and in steam-tight contact with the bore and bolt, as shown in Fig. 3, thereby forming a tight joint non-superable to the leakage of steam or water.

The interior nut D may be made without the shoulder, and the flat face of the nut screwed upon the bar in close contact with the boiler and packing, without departing from the nature of my invention. The invention may be used in boilers with or without re-enforcing plates in the heads thereof.

In Fig. 1 the bolt or bar is shown in connection with a special construction of boiler, which is only taken as an illustration, as the improvement may be applied to any steam-boiler and various kinds of tanks.

What I claim, and desire to secure by Letters Patent, is—

1. A stay bar or bolt having an exterior and an interior nut thereon, said nuts having a shoulder or projection extending into the hole of the boiler-plate with packing circumscribing the bolt between the two nuts and within said hole, whereby the nuts are caused to form a steam-tight joint, substantially in the manner specified.

2. A stay-bolt having exterior and interior nuts, one or both of which are formed with a shoulder thereon, in combination with a steam-boiler having holes therein arranged to admit the terminals of said bolt, and sufficiently large to contain a certain amount of packing surrounding said bolt in said hole, substantially as and for the purpose set forth.

In testimony whereof I affix my signature in presence of two witnesses.

CHRISTIAN E. SCHAFER.

Witnesses:
W. H. BURRIDGE,
L. F. GRISWOLD.